United States Patent [19]
Crosby et al.

[11] 3,780,207
[45] Dec. 18, 1973

[54] VIBRATION DAMPER

[75] Inventors: Noble Wellington Crosby, Trenton; Robert Clinton Walker, Newmarket, Ontario, both of Canada

[73] Assignee: Lacal Industries Limited, Newmarket, Ontario, Canada

[22] Filed: July 5, 1972

[21] Appl. No.: 269,188

Related U.S. Application Data
[63] Continuation-in-part of Ser. No. 163,882, July 19, 1971.

[52] U.S. Cl.................... 174/42, 267/136, 188/1 B
[51] Int. Cl............................................... H02g 7/14
[58] Field of Search........................... 267/134, 136; 174/42; 188/1 B

[56] References Cited
UNITED STATES PATENTS
3,614,291  10/1971  Pullen................................. 174/42

*Primary Examiner*—James B. Marbert
*Attorney*—Roy H. Saffrey et al.

[57] ABSTRACT

This invention concerns a vibration damper for a suspended cable comprising a housing, means for clamping said housing to a suspended cable, said housing having a sealed chamber, an inertia member in said sealed chamber, resilient means in said sealed chamber compressible in the spacing between said sealed chamber wall and said inertia member and maintaining said inertia member spaced from the wall of said sealed chamber under static conditions, said resilient means being compressible as said housing member moves with respect to said inertia member under conditions of vibration of said housing, a viscous damping fluid in said sealed chamber, said viscous damping fluid having a viscosity to dampen vibration as it is displaced in said chamber by said inertia member under conditions of vibration.

12 Claims, 5 Drawing Figures

PATENTED DEC 18 1973

PATENTED DEC 18 1973

VIBRATION DAMPER

This invention relates to a vibration damper for damping the vibration of a suspended cable, such as an electricity transmission cable and is a continuation-in-part of application Ser. No. 163,882, filed on July 19, 1971.

It is well known that suspended cables vibrate under wind conditions. The importance of preventing vibration as a means of eliminating excessive wear and fatigue of cables is also well recognized. Damping by the introduction of frictional forces to reduce the vibration amplitude has long been applied and many damper designs have been used.

The damper of this invention is a viscous damper wherein the energy of the unwanted vibration is dissipated as a viscous fluid is displaced in a sealed chamber by an inertia member and an advantage apart from its damping efficiency, lies in the fact that the damping arrangement is entirely housed within a sealed chamber. Its operation is therefore unaffected by weathering and weather conditions. The damper has been tested and found particularly effective for minimizing aeolian vibrations of electricity conductors.

It is an object of this invention to provide an efficient and rugged vibration damper wherein the operating parts are all contained within a sealed housing.

A vibration damper for a suspended cable according to this invention comprises a housing, means for clamping said housing to a suspended cable, said housing having a sealed chamber, an inertia member in said sealed chamber, resilient means in said sealed chamber compressible in the spacing between said sealed chamber wall and said inertia member and maintaining said inertia member spaced from the wall of said sealed chamber under static conditions, said resilient means being compressible as said housing member moves with respect to said inertia member under conditions of vibration of said housing, a viscous damping fluid in said sealed chamber, said viscous damping fluid having a viscosity to dampen vibration as it is displaced in said chamber by said inertia member under conditions of vibration.

The invention will be clearly understood after reference to the following detailed specification read in conjunction with the drawings.

Figure 1:
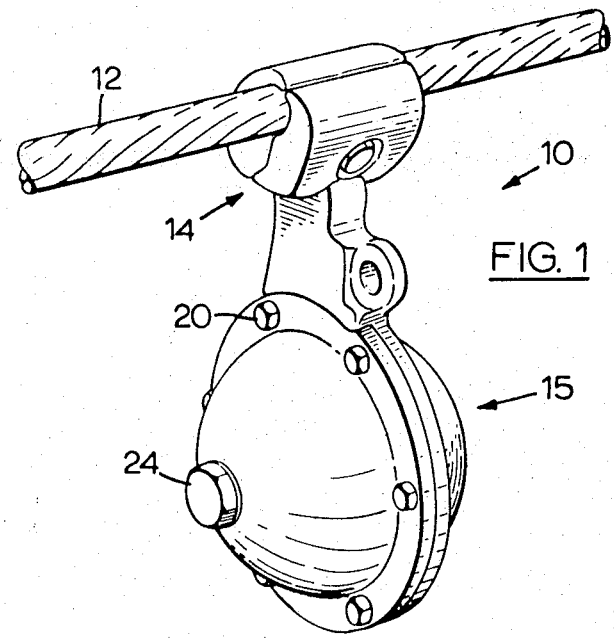
FIG. 1 is a view of a vibration damper according to this invention suspended from a conductor cable.

Referring to the drawings, the numeral 10 generally refers to a vibration damper according to the invention. In FIG. 1 it is illustrated suspended from an electricity transmitting conductor cable 12. The vibration damper illustrated has been designed to suppress aeolian vibration. Aeolian vibrations exist substantially in a vertical plane, and are caused by alternate formation of eddy currents or vortices above and below the longitudinal axis of a conductor on the leeward side of the conductor. The damper, therefore, is suspended to hang directly below the conductor according to standard practice in the damping of aeolian vibration.

The damper, generally indicated by the numeral 10, comprises a housing that has a clamping arrangement, generally indicated by the numeral 14, for clamping it to the cable 12 and a sealed chamber 15 defined by sections 16 and 18 which are bolted together by means of bolts 20. The interface between the two sections is sealed by means of a neoprene O-ring 22. A drain plug 24 threads into a drain opening and is used for the purpose of filling the chamber with a viscous damping fluid, as will be apparent later. Numeral 26 is a gasket for the drain plug.

An inertia member 28 in the form of a steel sphere is contained within the chamber of the housing. It will be noted that the inertia member is smaller than the spherical chamber of the housing and that it is resiliently supported in spaced relation with respect to the wall of the chamber. The function of the inertia member will be referred to in greater detail later.

There are three pairs of diametrically opposed dashpots 30, each pair being on a mutually perpendicular axis to each other pair. Each of the dashpots is provided with a plunger in the form of a steel ball bearing 32 and a spring 34 seats in the bottom of each dashpot and has a strength to urge its respective ball in contact with the ball of the sealed chamber 15 of the housing to maintain the inertia member between the walls of the sealed chamber under normal static conditions as indicated in FIG. 1.

The springs 34 are compressible in the spacing between the sealed chamber wall and the inertia member as the inertia member moves with respect to the wall of the sealed chamber under conditions of vibration, as will be referred to later.

The sealed chamber 15 and the dashpots are substantially filled with a viscous damping fluid which has a viscosity adapted to dampen the vibration as it is displaced in the chamber by the inertia member under conditions of vibration. In this respect, a small air space must be left in the sealed chamber to permit expansion and contraction of the damping fluid under conditions of varying temperatures encountered in use.

Figure 4:
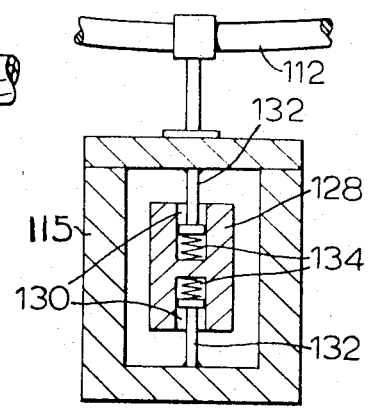
FIG. 4 is a schematic illustration illustrating the principle of operation of the damper.

Reference will now be made to FIG. 4. This figure is schematic and intended to illustrate the principle of operation. It illustrates a damper having a casing 115 with a sealed chamber that houses an inertia member 128. The inertia member has one pair of aligned dashpots 130, each of which has a plunger 132 therein, one end of which bears against the inside wall of the sealed chamber of casing 115. The plungers 132 are rigidly secured to the inside of the casing. The casing 110 is suspended from a cable 112 that is subject to vibration in the vertical direction.

The principle of operation of the device will be described by reference to schematic illustration, FIG. 4.

Member 128 is an inertia member, that is, it is designed to have a mass related to the mass of a free loop length of vibrating cable that it is designed, in operation, to dampen, so that upon the occurrence of aeolian vibration of the conductor it will tend to maintain its position as the casing 115 tends to vibrate with the conductor.

Let it be assumed that the conductor 112 is in a condition of aeolian vibration and is vibrating in a vertical direction. Thus, the damper housing 115 vibrates in a vertical direction as it follows the conductor. FIG. 4 illustrates the at rest position wherein the inertia member is supported between the top and bottom wall of the chamber of the housing between the spring members 134. Let it be assumed that the first vibrational movement is in a downward direction. As the casing moves downwardly under the influence of the downward movement of the conductor, the inertia member 128 tends to maintain its position due to its mass. It lags the casing in its initial downward movement. As it does so, the spacing between the top of the inertia member and the top of the chamber wall is reduced, as the plunger 132 of the top dashpot is forced into its respective dashpot and its spring 134 is commmpressed. At the same time plunger 132 in the bottom dashpot extends from its dashpot as the spacing between the bottom of the inertia member and the chamber wall increases and its spring 134 extends itself. Thus as a result of the initial downward movement of the casing, the upper plunger is forced into its dashpot and the lower plunger extends with respect to its dashpot as the inertia member moves with respect to the casing. With this change in position of the dashpot plungers the viscous fluid is forced around the plungers and the resistance to the flow of fluid absorbs the energy of the applied vibration.

When the direction of movement of the conductor is reversed in an upward direction, the inertia member tends to maintain the lower position and the casing moves upwardly to reduce the spacing between the lower inertia member and the sealed chamber wall. As this occurs, the plunger in the lower dashpot is forced into its dashpot and the plunger in the upper dashpot moves outwardly with respect to its dashpot. Here again, energy from the vibration is expended in the friction of the viscous fluid as it flows due to the displacement of the inertia member in the chamber.

Controlled resistance to fluid flowinto and out of the dashpots dissipates energy and in doing so limits the rate at which the conductors can vibrate. The amount of energy dissipation is a function of the clearance between the plunger and the sides of the dashpots within which they operate.

Figure 2:
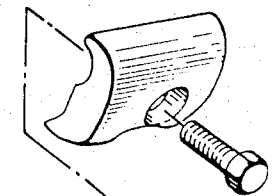
FIG. 2 is an exploded view of the vibration damper.
Figure 2:
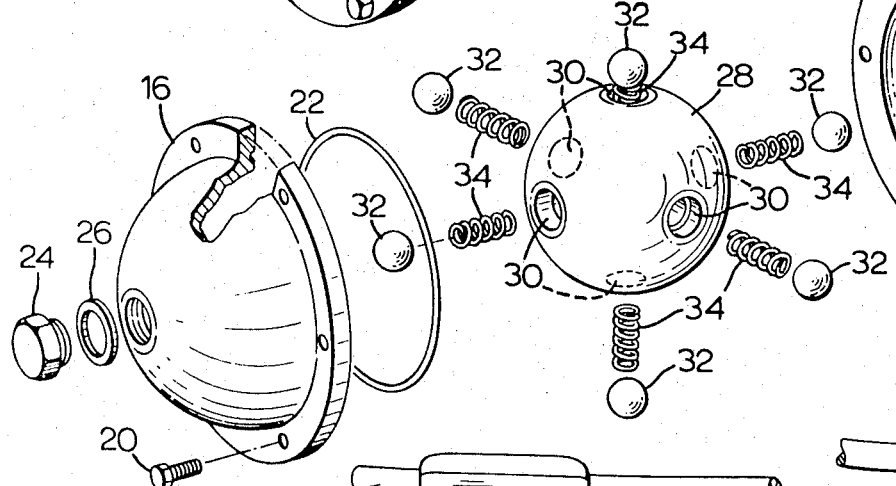
Figure 3:
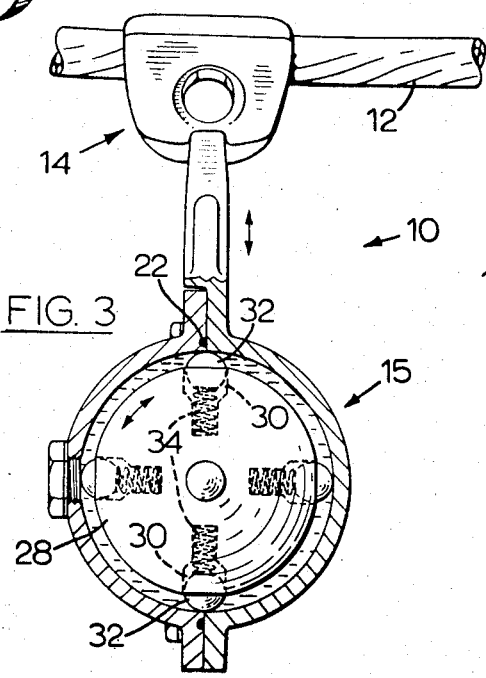
FIG. 3 is a sectional view of the assembled damper.

FIG. 4 is a schematic illustration of a damper according to the invention and in this figure only two dashpots have been described. A damper having two dashpots is intended to be within the scope of the invention but there are preferably more than two dashpots and the inertia member and sealed chamber are spherical. In FIGS. 1, 2 and 3 there are six dashpots arranged in pairs on mutually perpendicular axes of a spherical inertia member. For the purposes of illustration one pair of dashpots has been illustrated as extending in a vertical direction, but in actual use the aligned axes of the pairs of dashpots would assume a position in which the weight of the mass is equally supported in the sealed chamber by one of the ball plungers 32 of each of the three pairs of ball plungers. It will be apparent that under conditions of vibration the inertia member is free as it rotates within the chamber to align with the direction of applied vibration. The applied vibration is not always entirely vertical and the provision of the rotatable inertia member is capable of absorbing energy of vibration having a horizontal as well as a vertical component.

With the embodiment of the invention illustrated in FIGS. 1, 2 and 3 wherein a spherical inertia member is used with three pairs of aligned dashpots, each having a spring urged ball type plunger, a steel inertia member having a diameter of approximately 4.23 inches and weighing 13 pounds has been found satisfactory when mounted in a chamber with a clearance between the walls of the chamber under static conditions from about 0.20 inches. The plungers of dashpots have a diameter of about 0.75 inches and the dashpots within which the plungers operate have a diameter of about 0.790 inches. In this respect, it has been found that an improved result can be achieved by tapering the dashpot from its outside surface diameter from 0.79 inches to 0.062 inches at its bottom. The depth of the dashpots is 0.400 inches. Such a vibration damper has satisfactorily dampened vibration on a 795 MCM conductor.

The springs 134 must, of course, have a resilience that will yield to permit the balls to enter the dashpots as the inertia member moves against the walls of the chamber under conditions of vibration and must also be strong enough to urge the ball plungers outwardly of their respective dashpots as the distance between the inertia member and the chamber wall increases. It has been found that a spring rate of 93 lb/inch works well in the design of FIGS. 1 and 2 with a 13 pound inertia member as specified above.

The viscosity of the hydraulic fluid that works its way around the chamber and into and out of the dashpots under conditions of vibration is such that it will absorb energy of vibration as it is forced into and out of the dashpots. It must also be of a characteristic that is substantially constant over a wide temperature range. Silicon oils having suitable viscosities that remain substantially constant over temperature ranges in the order of from 100°F to 70°F are commercially available. Such an oil having a viscosity of 30 zahn seconds over the temperature range has been proven satisfactory in the device above specified.

It will be appreciated that variation in the design is, of course, possible. The design given above has worked well dampening aeolian vibration for a 795 MCM conductor. A device for the same conductor having an inertia member weighing 10 pounds has also worked well. Experiments have also been carried out with an inertia member having a weight of about 8 pounds and a good result has been achieved.

It should also be noted that when filling the chamber of the casing with the viscous fluid an air bubble should be left sufficiently large in size to account for the relative differences in expansion and contraction of the casing and the viscous fluid with changes in temperature. If such a bubble is not left, it is possible that expansion effects will break the casing.

The number of dashpots and the specific design of the inertia member are variable within the scope of the invention.

Figure 5:
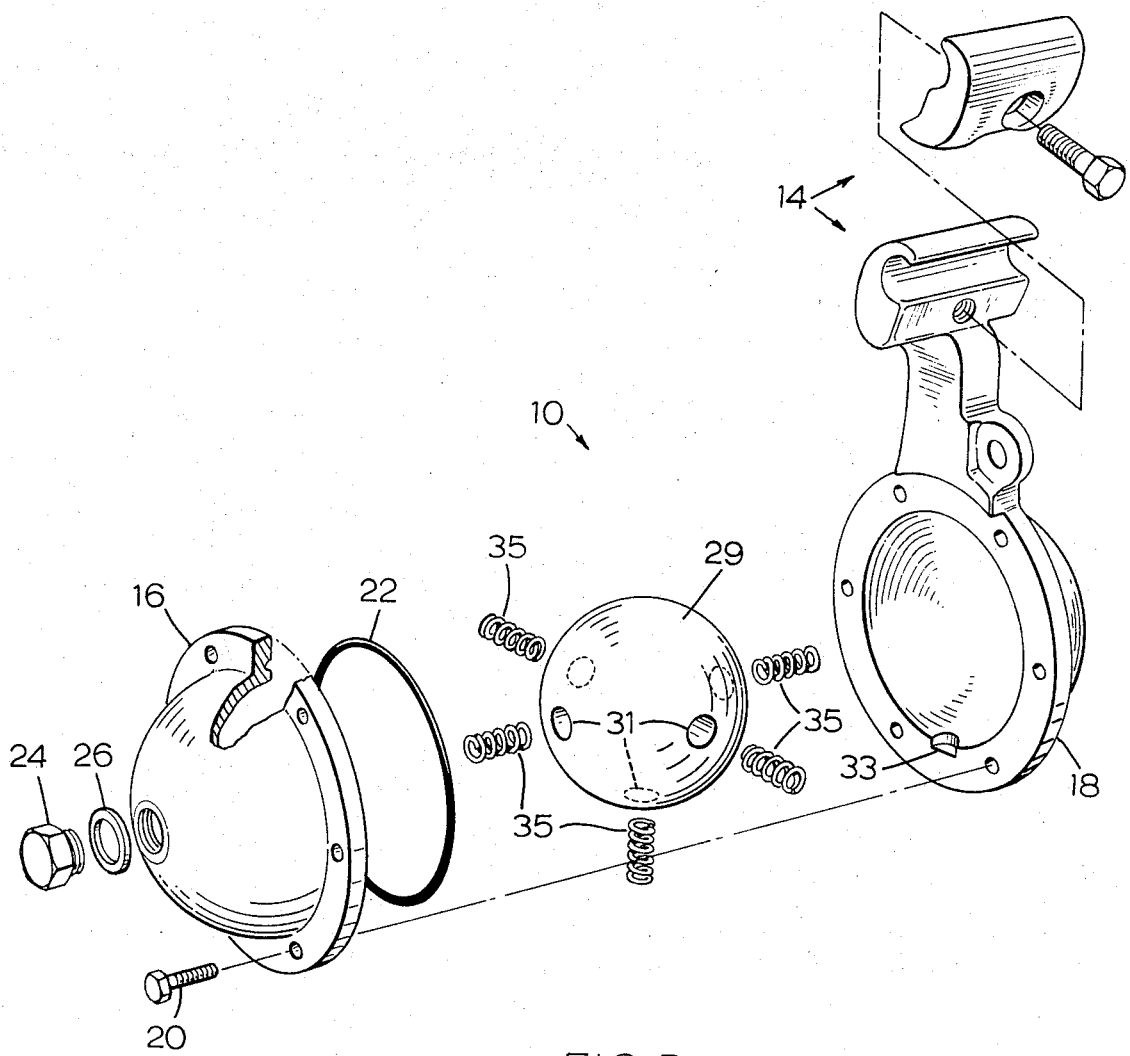
FIG. 5 is an exploded view of an alternative damper design.

FIG. 5 illustrates an alternative design in which the inertia member 29 has no dashpots but wherein damping is achieved in the same general manner, i.e. the dissipation of energy of vibration in a body of viscous fluid as the fluid is forced around the external surface of the inertia member due to movement of the inertia member within the sealed chamber of the casing.

In the case of the embodiment illustrated in FIG. 5, the inertia member 29 is supported within the casing by springs 35. It will be noted that one free end of each spring is retained in a socket hole 31 in the inertia member 29. The other end of the bottom spring is anchored in a cavity 31 at the centre of the casing. The other end of the other springs bear against the side wall of the spherical chamber of the casing whereby to support the inertia member within the casing in spaced relationship to the wall of the casing. Four springs have been shown around the side of the casing but the number of side springs is not material. It is only necessary that they space the inertia member from the side of the casing.

These springs are compressible between the wall of the sealed chamber and the inertia member under conditions of vibration, as explained above. The weight of the inertia member is designed, as indicated above, and under conditions of vibration the springs are compressed and reassert themselves as the housing member moves with respect to the inertia member and the viscous fluid is forced around the periphery or external surface of the sphere. The resistance to fluid flow around the periphery of the sphere dissipates the energy of vibration and limits the rate at which the conductor to which the damper is mounted can vibrate.

In establishing the design, the same considerations apply as indicated above. One simply equates the mechanical impedance of the conductor to the dashpot constant of the damper. The dashpot constant is a function of the spring rate of the springs supporting the inertia member, the lowest conductor frequency to be supressed and the viscosity of the fluid within the chamber of the casing. The term "dashpot" as used in this paragraph refers to the overall dashpot function of the device. In the case of FIG. 5, there is essentially one large dashpot within which the inertia member moves. In the embodiment illustrated in the other figures, there are in addition samller dashpots with plungers on the inertia member.

A good performing damper in accordance with FIG. 5 of the drawings for 795 MCM conductor has been built with a chamber similar in proportions to the chamber of the embodiment of FIG. 5 and described above, i.e. with diameter of about 4.63 inches, an inertia member weighing 13.9 pounds and springs 34 having a spring rate of 12.7 pounds per inch. The viscous fluid used was 30 zahn seconds.

What we claim as our invention is:

1. A vibration damper for a suspended cable comprising a housing, means for clamping said housing to a suspended cable, said housing having a sealed chamber, an inertia member in said sealed chamber, resilient means in said sealed chamber compressible in the spacing between said sealed chamber wall and said inertia member and maintaining said inertia member spaced from the wall of said sealed chamber under static conditions, said resilient means being compressible as said housing member moves with respect to said inertia member under conditions of vibration of said housing, a viscous damping fluid in said sealed chamber said viscous damping fluid having a viscosity to dampen vibration as it is displaced in said chamber by said inertia member under conditions of vibration.

2. A vibration damper as claimed in claim 1, in which said sealed chamber is spherical and in which said inertia member is spherical.

3. A vibration damper as claimed in claim 1, in which said resilient means comprises a plurality of coil springs.

4. A vibration damper as claimed in claim 2, in which said resilient means comprises a plurality of coil springs.

5. A vibration damper as claimed in claim 2, in which said resilient means comprises a plurality of coil springs with their axes aligned with the centre of said inertia member.

6. A vibration damper as claimed in claim 1 in which said inertia member is formed with dashpots that open in directions of intended vibration of said housing, said dashpots having plungers therein, said resilient means being in said dashpots between the bottom of said dashpots and said plungers, said plungers being in contact with the wall of said sealed chamber, said viscous damping fluid being adapted to pass around said plungers of said dashpots under conditions of vibration.

7. A vibration damper as claimed in claim 6, in which said sealed chamber is spherical and in which said inertia member is spherical.

8. A vibration damper as claimed in claim 6, in which there are at least three pairs of diametrically opposed dashpots, each pair being on a mutually perpendicular axis to each other pair.

9. A vibration damper as claimed in claim 6, in which said plungers are spherical in shape.

10. A vibration damper as claimed in claim 7, in which said plungers are spherical in shape.

11. A vibration damper as claimed in claim 8, in which said plungers are spherical in shape.

12. A vibration damper as claimed in claim 7, in which said dashpots are tapered inwardly from their opening.

* * * * *